United States Patent Office 3,445,443
Patented May 20, 1969

3,445,443
PROCESS FOR THE PREPARATION OF POLY-
OLEFINS WITH A TRANSITION METAL
HALIDE-ORGANO ALUMINUM COMPOUND
CATALYST
Juntaro Sasaki, Iwakuni-shi, and Toshio Senoue and
Tadaichi Tokuzumi, Ootake-shi, Japan, assignors to
Mitsui Petrochemical Industries, Ltd., Tokyo, Japan,
a corporation of Japan
No Drawing. Filed Mar. 15, 1965, Ser. No. 439,933
Claims priority, application Japan, Mar. 24, 1964,
39/15,898
Int. Cl. C08f 1/42
U.S. Cl. 260—93.7                                  5 Claims

ABSTRACT OF THE DISCLOSURE

A process for the preparation of 1-olefin polymers, particularly polypropylene, which comprises employing a catalyst system consisting of an admixture of (1) an active complex insoluble in a liquid hydrocarbon obtained by reacting (a) a halogen compound of a metal at the highest valency selected from the group consisting of the metals of the Groups IV–A, V–A, and VI–A of the Periodic Table with (b), an organo metallic compound of the metals selected from the group consisting of alkali metals, alkaline earth metals, zinc cadmium and earth metals, and (2), an aluminum compound of the formula Al(OR)R'X, wherein R and R' are monovalent radicals selected from the group consisting of alkyl and phenyl and X is a halogen atom.

This invention relates to a process for the preparation of high polymers and copolymers of 1-olefins having high crystallinity and having preferably stereo-regularity by using a novel catalyst composition.

Hitherto the use of an admixture of transition metal halides, e.g., the halides of the metals of Group IV–VI and Group VIII of the Periodic Table and organometallic compounds, especially the aluminium alkyl compounds as a polymerization catalyst for olefins has been known. This catalyst system is not usually of a sufficiently high activity, and the physical properties of the resulting polymers are not wholly satisfactory. Such being the case, a number of attempts have been made to find a catalyst having high activity for obtaining 1-olefin polymers. As one of such catalyst systems there has been known a combined catalyst of an active complex produced by reacting a halide of a transition metal and an aluminium compound, and alkyl aluminium alkoxide. However, when with the use of this catalyst, 1-olefins such as propylene is singly polymerized or copolymerized with ethylene or other 1-olefins, almost all of the resulting polymers possess atactic structure and low crystallinity and are in the form of a rubber-like wax containing a high proportion of amorphous polymer. In the case of propylene, for example, the resulting polymer has only about 25% of crystallinity.

In copending application U.S. Ser. No. 409,931, there is disclosed a process for preparing highly crystalline 1-olefin polymers by using a catalyst system by which it is intended to eliminate the foregoing drawbacks of the prior art catalyst systems. The catalyst system proposed comprises a mixture of the following three components:

(1) A reaction product of, e.g., titanium tetrachloride and trialkylaluminum,
(2) A compound, e.g., such as dialkyl aluminum alkoxide, and
(3) A halide of a metal such as, e.g., aluminum and copper.

The present invention provides a process for preparing 1-olefin polymers wherein these polymers are prepared using a catalyst system which possesses activity for polymerization comparable, if not superior, to the foregoing catalyst system, and in addition, is a much more simplified system.

Namely, a primary object of the present invention is to provide a simplified process for preparing 1-olefin polymers possessing high crystallinity by using a new catalyst composition having a very high activity for polymerization.

Another object of the invention is to provide a process for preparing 1-olefin polymers by which copolymers having high crystallinity can be obtained even when different 1-olefin monomers are combined and copolymerized.

A further object of the invention is to provide a polymer of copolymer of 1-olefin which not only possesses the aforesaid properties but also possesses high stereoregularity.

The present invention is directed to a process for preparing 1-olefin polymers and copolymers having high crystallinity which comprises polymerizing at least one 1-olefin in the presence of a catalytic amount of a catalyst composition which is obtained by the admixture of the following components:

(1) The reaction product obtained by reacting
(a) A halide of a metal at its highest valence, selected from the group consisting of the metals of Groups IVa, Va and VIa of the Periodic Table, and
(b) An organometallic compound of a metal selected from the group consisting of the alkali metals, alkaline earth metals, zinc, cadmium and earth metals; and
(2) An aluminum compound of the formula (I)     Al(OR)R'X where R and R' are monovalent hydrocarbon radicals and X is halogen.

In preparing the catalyst composition of this invention, the first component of the catalyst, i.e., the reaction product of a halide of a transition metal and an organometallic compound can be prepared in accordance with customary procedures. The halide of a transition metal, one of the reaction components of the first component of the invention catalyst, is a halide of a metal selected from the group consisting of the metals of Groups IVa, Va and VIa of the Periodic Table, at the metals' highest valence. Suitably used are titanium tetrachloride and vanadium (V) oxytrichloride. The organometallic compound, the other reaction component, is an organometallic compound of a metal selected from the group consisting of the alkali metals, alkaline earth metals, zinc, cadmium and earth metals. Typical examples of the alkali metal are lithium, sodium and potassium. As the example of alkaline earth metal, there is magnesium. Boron and aluminum are the examples of the earth metal. Particularly suitable are the organometallic compounds of aluminum. Of these organometallic compounds of aluminum, those alkyl aluminum compounds having from 1 to 4 carbon atoms, e.g., triethyl aluminum, diethylaluminum chloride, ethylaluminum dichloride and ethylaluminum sesquichloride are especially preferred.

By way of example, taking the case of titanium tetrachloride, there are the following combinations of the reaction:

(II)   $3TiCl_4 + AlR_3$
(III)  $2TiCl_4 + AlR_2Cl$
(IV)   $3TiCl_4 + (AlRCl_2 + AlR_2Cl)$
(V)    $TiCl_4 + AlRCl_2$

Any of the reaction products obtained in the above reactions may be suitably employed. These reaction products contain an active complex which is insoluble in liquid hydrocarbons. Generally speaking, it is preferred to wash the reaction product with a liquid hydrocarbon to remove the unreacted reactants, following which the insoluble portion is suspended in a liquid hydrocarbon. However, the reaction product may at times be used without washing with the liquid hydrocarbon.

The second component of the invention catalyst composition is a compound having the formula (I) Al(OR)R′X where R and R′ are monovalent hydrocarbon radicals and X is halogen.

In general, R and R′ are the alkyl, aryl, aralkyl or alkaryl radicals. It is preferred that R and R′ are either an alkyl or aryl radical. Further, it is particularly preferred that R and R′ are both either a lower alkyl or phenyl radical such as methyl, ethyl, propyl, n-butyl and isobutyl. On the other hand, it is generally preferred that X is either chlorine or bromine.

Thus, compounds suitable for use as the second component include ethyl-ethoxyaluminum monochloride, ethyl-ethoxyaluminum monobromide, ethyl-phenoxyaluminum monochloride and phenyl-ethoxyaluminum monochloride.

The second component of the catalyst, as used in the present invention, having the formula Al(OR)R′X differs markedly from the organometallic compounds of aluminum which have been used hitherto in this type of composite catalyst. Namely, this second component compound is one in which to the aluminum atom, are bonded one hydrocarbon radical, one alkoxy or aryloxy radical and one halogen atom. When 1-olefins, such as propylene, are polymerized using as catalyst a composition consisting of a halide of a transition metal and an organometallic compound of aluminum, the compound usually used is one in which to the aluminum atom are bonded 2 to 3 hydrocarbon radicals. If these compounds are represented by the formula $AlR''_nX_{3-n}$, wherein R″ is a hydrocarbon radical, X is halogen and n is an integer from 1 to 3, those that have been used heretofore are merely the $AlR''_3$ and $AlR''_2X$. The compounds such as $AlR''X_2$ have not been used because of their low polymerizing ability. Namely, as the number of R's bonded to the aluminum becomes smaller in the foregoing formula, it has been generally believed in accordance with the prior art that the activity for polymerization becomes smaller.

Further, in the case of a compound wherein the R″ radical of the foregoing compound $AlR''_3$ is substituted with either an alkoxy or aryloxy radical represented by OR‴, where R‴ is a hydrocarbon radical, e.g., a compound having the formula $AlR''_2OR'''$, it has hitherto been believed that the catalytic activity for polymerization of 1-olefins and/or stereo-regularity of the resulting polymer would be impaired by this substitution.

Hence, that the catalyst system containing as its second component the compound having the formula Al(OR)R′X as specified in this invention, would exhibit a great activity for polymerization of 1-olefins and also yield polymers having superior stereo-regularity could not possibly have been obvious from the prior art disclosures such as mentioned herebefore.

These facts will become more fully apparent when a comparison is made between the instance of the use, as the second component in the hereinafter given Example 1, of the invention catalyst composition and the instance where ethyl aluminum dichloride or diethyl aluminum ethoxide is used.

In carrying out the present invention, the mol ratio between the first component of the catalyst, i.e., the active complex of the halide of a transition metal and an organometallic compound, and the second component such as, for example, ethyl-ethoxyaluminum monochloride may be varied in a wide range of 10:1 to 1:20. Usually a mol ratio such as 5:1 to 1:3 may suitably be used.

According to the present invention, in preparing the above described catalyst composition, a variety of conditions concerning the mixing order, mixing temperature and mixing apparatus for the respective components of the catalyst may optionally be selected.

The mixing temperature is particularly suitable in a range between −20° C. and 100° C. In mixing, if necessary, a proper diluent, for example, n-heptane, kerosene or the like is preferably used. The concentration in this case may be varied in a very wide range from a very low concentration of 0.1 mmol/l. to a complete undilution. However, it is generally preferred to carry out the mixing in an inert solvent, from the standpoint of continuing the subsequent polymerization reaction.

1-olefins to be used in the process of this invention are the olefins having not less than 2 carbon atoms, thus contain ethylene, propylene, n-butene-1, pentene-1 and styrene. In this invention, in view of the specific properties of the above catalyst composition, 1-olefin, namely asymmetrical olefin hydrocarbons which are preferably used for obtaining high polymers having high stereo-regularity may favorably be used. Among asymmetrical olefinic hydrocarbons, propylene is most suitable for this invention. It is of course possible to use ethylene alone in this invention, however ethylene may be preferably used for the purpose that high polymers having both high crystallinity and high stereo-regularity may be produced by its use along with asymmetrical olefinic hydrocarbons such as propylene as a monomeric component of the copolymer.

In carrying out the process of this invention, the polymerization conditions may be varied in a wide range. For example, the polymerization process may be carried out either batch-wise or continuously. The polymerization may be carried out with or without the use of an inert organic diluent such as liquid saturated hydrocarbons, for example n-heptane. In the polymerization reaction, the pressure and temperature may properly be selected depending on the types of monomers to be used, concentration of the catalyst, the degree of polymerization of the polymers to be obtained and the like. Usually, a polymerization temperature of −20° C. to 100° C. and a pressure in the range of reduced pressure to approximately 50 atmospheres are to be used.

The catalyst is preferably added in an amount such that the transition metal component [(1), (a) component] is present generally in an amount of 0.1 to 1000 mmols, and particularly 1 to 100 mmols, per mol of the monomeric 1-olefin used. Further, when the catalyst system is used suspended in an inert solvent, a concentration of the aforesaid transition metal component [(1), (a) component] of 1 to 5000 mmols/l. of the inert solvent is particularly suitable.

Thus, in accordance with the process of this invention, high polymers of 1-olefin having high stereo-regularity may be obtained in much higher yields as compared with the use of known catalyst systems.

The following examples are given to further illustrate the invention.

Example 1.—Process for preparation of the first catalyst component which is insoluble in hydrocarbon 386 mmols of diethyl aluminum chloride were dissolved in 1-liter of kerosene distilled in the presence of potassium-sodium alloy, and 594 mmols of titanium tetrachloride was added dropwise to the solution with stirring in a nitrogen atmosphere at room temperature. Instantly, a brown or dark brown precipitate was formed. The stirring was continued for an additional 3 hours, and thereafter the system was allowed to stand still to complete the precipitation. By decantation the precipitate was separated from the mother liquor, washed with kerosense which had been refined as hereinabove described. After repeating this operation several times, the precipitate was added to refined kerosense, shaken well and suspended. In this case the precipitate contains trivalent titanium compound, the concentration of which can be determined by titration.

Preparation of the catalyst and polymerization of propylene (a) A separately provided polymerization vessel equipped with a stirrer, a thermometer and a gas inlet, and filled with 250 ml. of refined kerosene, was charged with 10 ml. of a kerosene solution of ethyl-ethoxy-aluminum monochloride (concentration 1.0 mol/l.) with stirring in an atmosphere of nitrogen gas. Thereafter 14.8 ml. of the above tri-valent titanium compound suspension (containing 1.01 mol of titanium per liter) was added. The mixture was heated to a temperature of 70° C. with stirring, followed by the continuous introduction of propylene to effect the polymerization reaction. After 4 hours the introduction of propylene was stopped and the reaction mixture was treated with an aqueous solution of methanol-hydrochloric acid.

The reaction mixture was further well washed, then dried under reduced pressure and 118 g. of polypropylene in white powder form were obtained. The obtained polymer was subjected to fractional extraction with boiling n-heptane by means of a Soxhlet extractor, and it was observed that the undissolved polymer was 86% and from the results of the analyses of X-ray diffraction and infrared spectra the polymer was found to be polypropylene having high crystallinity. The intrinsic viscosity of the polymer insoluble in boiling n-heptane as measured in decalin at 135° C. was 4.87 and the viscosity average molecular weight as calculated from the R. Chiang formula [J. Polymer Sci., 28 116 (1958)] was $71 \times 10^4$.

Now, a comparison will be made between the second catalyst component of the present invention and the previously mentioned $AlR''X_2$ and $AlR''_2OR'''$ type compounds.

(b) Sixty ml. of a suspension of the foregoing hydrocarbon-insoluble catalyst component and 60 ml. of a kerosene solution of ethyl-aluminum dichloride (1.0 mol/l.) were mixed and, as described in section (a) above, propylene was introduced and contacted with the catalyst composition. After treating the resulting reaction mixture, as described in section (a) above, the amount obtained of the polymer was no more than 0.5 g.

(c) When instead of the ethyl-ethoxyaluminum monochloride used in the method described in section a, above, diethylaluminum ethoxide was used, but otherwise the polymerization of propylene was carried out as described in said section a, the reaction mixture became a viscous paste to render its separation from the solvent a very difficult matter. When the reaction mixture was treated with an aqueous methanol-hydrochloric acid mixture, then thoroughly washed further with methanol and thereafter the solvent kerosene was distilled off under reduced pressure, 90 g. of a lumpy polymer were obtained. The residue after extracting this polymer with boiling n-heptane amounted to only 20%, a major portion thereof being an amorphous polymer.

Example 2

Propylene was polymerized under the same conditions as in Example 1 except that ethyl-phenoxyaluminum monochloride was used in place of ethyl-ethoxyaluminum monochloride and 100 g. of white powder of polypropylene were obtained. The polypropylene thus obtained was extracted with boiling n-heptane and the polymer insoluble in the solvent reached 89%. The viscosity average molecular weight of this polymer was $67 \times 10^4$.

Example 3

Except that instead of the propylene a mixed gas consisting of 88% by volume of propylene and 12% by volume of ethylene was introduced, the polymerization reaction was carried out otherwise under identical conditions as in Example 1. After 4 hours, 73 g. of white solid polymer in powder form were obtained. The boiling n-heptane extraction residue was 60%.

Example 4

The polymerization reaction was carried out by introducing butene-1 in place of propylene gas under the same conditions as in Example 1 except that the polymerization temperature was maintained at 50° C. After 4 hours, 88 g. of white solid polymer is powder form were obtained. The polymer insoluble in boiling ether was 76% by weight.

Example 5

The polymerization reaction was carried out by adding 100 ml. of styrene in place of propylene gas under the same conditions as in Example 1 except that n-heptane was used as a solvent. After 5 hours, 40 g. of white solid polymer in powder form were obtained. The infrared spectrum analysis showed that this polymer was highly crystallized polystyrene.

Example 6

In -liter of refined kerosene were dissolved 200 mmols of vanadium oxytrichloride, and then with stirring and under a nitrogen atmosphere at room temperature 210 mmols of a kerosene solution of diethyl cadmium were added dropwise, the stirring being continued for 5 hours at room temperature. 200 ml. of this solution were charged to a stainless steel 1-liter autoclave under a nitrogen atmosphere, following which 5 g. of phenyl-butoxy-aluminum monobromide were added. The temperature of the mixture was then raised to 70° C. with stirring, and the polymerization reaction was carried out for 5 hours while introducing propylene continuously under a pressure of 9 kg./cm.$^2$. This was followed by the addition of 200 ml. of n-butanol and stirring for 1 hour at 100° C., following which the autoclave was cooled and the reaction mixture taken out. The powdery polymer was separated by filtration and then upon washing this polymer and drying it under reduced pressure, 173 g. of polypropylene was obtained. The boiling heptane extraction residue of this polypropylene amounted to 81.4% and its viscosity average molecular weight was $84 \times 10^4$.

Example 7

One liter of refined kerosene and 200 mmols of chromium trichloride were mixed with 220 mmols of a kerosene suspension of butyl lithium under a nitrogen atmosphere, with stirring, the stirring being continued for 5 hours at 100° C. After cooling the reaction mixture, 200 ml. thereof were charged to a stainless steel 1-liter autoclave, to which were then added 25 ml. of a kerosene solution of ethyl-propoxyaluminum monochloride (concentration 1.0 mol/l.), following which the temperature of the mixture was raised to 80° C. with stirring. The polymerization reaction was then carried out for 5 hours by introducing propylene under a pressure of 9 kg./cm.$^2$. This was followed by the addition of 200 ml. of isopropyl alcohol and stirring for 1 hour at 100° C., after which the autoclave was cooled. The reaction mixture was taken out and washed with hot water, followed by drying of the powdery polymer under reduced pressure to obtain 64 g. of polypropylene. The boiling heptane extraction residue of this polymer amounted to 73% and its viscosity average molecular weight was $62 \times 10^4$.

Example 8

One liter of refined kerosene and 200 mmols of $TiCl_4$ were mixed with 250 mmols of a kerosene suspension of diphenylmagnesium under a nitrogen atmosphere, with stirring, the stirring being continued for 5 hours at 100° C. After cooling the reaction mixture, 200 ml. thereof were charged to a stainless steel 1-liter autoclave, then after adding 30 ml. of a kerosene solution of ethyl-butoxy-aluminum monochloride (concentration 1.0 mol/l.), propylene was polymerized for 5 hours at 70° C. under a pressure of 7 kg./cm.$^2$ while stirring the mixture. By giving the post-treatments as described in Example 7, 110 g. of polypropylene powder were obtained. The boiling heptane extraction residue of this polypropylene amounted to 92% and its viscosity average molecular weight was $115 \times 10^4$.

Example 9

The polymerization vessel described in Example 1 was charged with 250 ml. of refined kerosene, 2.5 ml. (2.5 mmols) of a kerosene solution of ethyl-ethoxyaluminum chloride and 2 ml. (2 mmols) of a suspension of titanium trichloride complex. After raising the temperature of the mixture to 70° C. with stirring, ethylene was continously introduced at atmospheric pressure to effect its polymerization. After 3 hours, the introduction of the ethylene was discontinued and by adding 100 ml. of methanol the polymerization reaction was stopped, following which the reaction mixture was washed with methanol and the resulting white powder was dried. 115 g. of polyethylene in white powder form were obtained. The apparent specific gravity of this polyethylene was 0.350.

Example 10

A 2-liter pressure reactor was charged with 750 ml. of refined kerosene, 5 mmols of ethyl-ethoxyaluminum chloride and 4 mmols of a suspension of titanium trichloride complex, and the polymerization reaction was carried out by introducing ethylene continuously at a pressure of 5 kg./cm.$^2$ at 70° C. After 5 hours, the introduction of the ethylene was discontinued, followed by treating the reaction mixture with a methanol-hydrochloric acid mixture to obtain 385 g. of polyethylene in white powder form. The apparent specific gravity of this polyethylene was 0.338 and its viscosity average molecular weight was $75 \times 10^4$.

We claim:

1. A process for the preparation of a 1-olefin homopolymer or copolymer having a high crystallinity by polymerizing a 1-olefin selected from the group consisting of propylene, butene-1, and a mixture thereof with ethylene in the presence of a catalyst composition, said catalyst composition consisting of an admixture of the following two components: (1) an active complex insoluble in a liquid hydrocarbon obtained by reacting (a) a halogen compound of a metal at the highest valency selected from the group consisting of the metals of Groups IV-A, V-A, and VI-A of the Periodic Table with (b) an organometallic compound of the metals selected from the group consisting of alkali metals, alkaline earth metals, zinc, cadmium and earth metals, and (2) an aluminum compound having the formula $$Al(OR)R'X$$

wherein R and R' are monovalent radicals selected from the group consisting of alkyl and phenyl radicals and X is a halogen atom, the molar ratio of the catalyst component (1) to the catalyst component (2) being in a range of from 10:1 to 1:20, said catalyst component (1)(a) being present in an amount of 0.1 to 1000 mmols per mol of said monomeric 1-olefin.

2. The process of claim 1 wherein the concentration of said component (1) in said liquid hydrocarbon being from 1 mmol to 5 mols per liter.

3. The process of claim 1 wherein said 1-olefin is propylene.

4. The process of claim 3 wherein said component (1) comprises the reaction product obtained by reacting (a) titanium tetrachloride with (b) an organic aluminum compound.

5. The process of claim 3 wherein said component (1) comprises the reaction product of (a) titanium tetrachloride and (b) an alkyl aluminum compound having 1 to 4 carbon atoms and said component (2) is ethyl-ethoxyaluminum monochloride.

References Cited

UNITED STATES PATENTS

| | | | |
|---|---|---|---|
| 2,904,542 | 9/1959 | Fasce et al. | 260—94.9 |
| 2,939,846 | 6/1960 | Gordon et al. | 252—431 |
| 3,032,510 | 5/1962 | Tornqvist et al. | 252—429 |
| 3,075,960 | 1/1963 | Lovett et al. | 260—93.7 |
| 3,131,171 | 4/1964 | Calfee | 260—94.9 |
| 3,225,022 | 12/1965 | Andersen et al. | 260—94.9 |

FOREIGN PATENTS 837,251  6/1960  Great Britain.

JOSEPH L. SCHOFER, *Primary Examiner.*

M. B. KURTZMAN, *Assistant Examiner.*

U.S. Cl. X.R.

252—429; 260—88.2, 93.5, 94.9